United States Patent
O'Connor et al.

(10) Patent No.: US 10,583,893 B2
(45) Date of Patent: Mar. 10, 2020

(54) TORQUE SENSOR FOR AN ELECTRIC BICYCLE

(71) Applicants: PROPULSION POWERCYCLE INC., St-Georges-de-Beauce (CA); INDUSTRIES RAD INC., St-Georges-de-Beauce (CA)

(72) Inventors: D'Arcy O'Connor, Vancouver (CA); Benoit Cloutier, Saint-Georges (CA)

(73) Assignees: INDUSTRIES RAD INC., St-Georges-de-Beauce; PROPULSION POWERCYCLE INC., St-Georges-de-Beauce ( * ) Notice: Subject to any disclaimer, the term of this patent is extended or adjusted under 35 U.S.C. 154(b) by 166 days.

(21) Appl. No.: 15/899,019

(22) Filed: Feb. 19, 2018

(65) Prior Publication Data
US 2018/0238754 A1     Aug. 23, 2018

Related U.S. Application Data

(60) Provisional application No. 62/461,284, filed on Feb. 21, 2017.

(51) Int. Cl.
*B62M 6/50* (2010.01)
*G01L 3/10* (2006.01)
(Continued)

(52) U.S. Cl.
CPC ................ *B62M 6/50* (2013.01); *B62M 6/70* (2013.01); *G01L 3/105* (2013.01); *G01L 3/108* (2013.01); *G01L 3/1435* (2013.01); *G01L 3/1478* (2013.01)

(58) Field of Classification Search
CPC . B62M 6/50; B62M 6/70; G01L 3/105; G01L 3/108
See application file for complete search history.

(56) References Cited

U.S. PATENT DOCUMENTS

| 5,984,038 A | * | 11/1999 | Fujiwara | B62M 6/45 180/206.4 |
| 9,771,096 B2 | * | 9/2017 | Hino | G01D 5/2451 |
| 2016/0332695 A1 | * | 11/2016 | Kimmich | B62M 6/55 |

FOREIGN PATENT DOCUMENTS

| DE | 102016205541 A1 | * | 10/2017 | ............. B62M 6/50 |
| JP | 08026173 A | * | 1/1996 | ............. B62M 6/50 |
| JP | 09328092 A | * | 12/1997 | ......... B62M 11/145 |

OTHER PUBLICATIONS http://www.conhismotor.com/ProductsList.asp?id=118.
http://www.cyclone-tw.com/3chkit.htm.
http://santamonicaev.com/page3/index.html.

* cited by examiner

*Primary Examiner* — Kevin Hurley
(74) *Attorney, Agent, or Firm* — Norton Rose Fulbright Canada LLP

(57) ABSTRACT

An electric bicycle having an electric motor mounted to a frame of the bicycle and which includes a motor output shaft defining an output end engaging a drive chain of the bicycles drive train to transmit the drive of the electric motor thereto. A torque sensor includes a base mounted in fixed relation to the frame and/or the electric motor. The torque sensor has a flexible arm extending from the base and a sensing member mounted to an extremity of the flexible arm that is displaceable relative to the base. The sensing member engages the drive chain along a segment thereof and is displaceable thereby. The segment of the drive chain extends from the output end of the motor output shaft to the pedal crank of the drive train.

21 Claims, 6 Drawing Sheets

(51) Int. Cl.
*B62M 6/70* (2010.01)
*G01L 3/14* (2006.01)

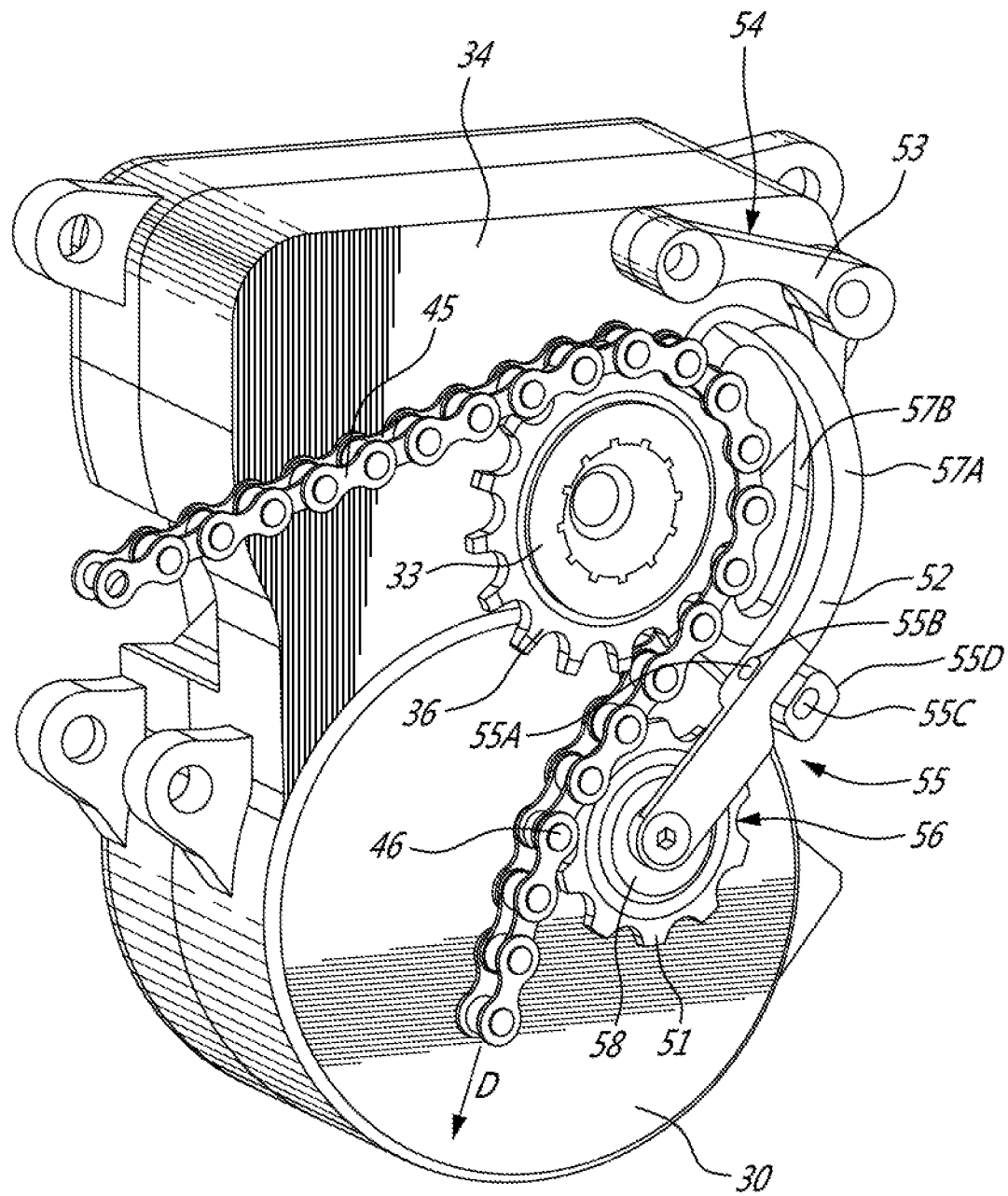

TORQUE SENSOR FOR AN ELECTRIC BICYCLE

CROSS-REFERENCE TO RELATED APPLICATIONS

The present application claims priority from U.S. Patent Application No. 62/461,284 filed Feb. 21, 2017, the entire content of which is incorporated herein by reference.

TECHNICAL FIELD

The present disclosure relates generally to bicycles, and more particularly, to electric bicycles.

BACKGROUND

Bicycles driven in whole or in part by assisted power are known in the art. The assisted power complements the driving force generated by the rider of the bicycle, and may replace it altogether. The assisted power can be provided by an internal-combustion or electric motor integrated with the bicycle.

Regardless of the source of the assisted power, it is useful to monitor the torque being applied to the chain of the bicycle. Depending on the measured torque, the assisted power can increase or decrease its output of torque to match the needs of the rider. Conventional devices for monitoring torque may be too large to be used in compact electric motors, may be exposed to the elements and thus susceptible to damage, and/or may capture torque values too slowly to be effective in complementing the driving force of the rider.

SUMMARY OF THE INVENTION

In accordance with one aspect of the present invention, there is provided an electric bicycle, comprising: a frame to which a front wheel and a rear wheel are rotatably mounted and having a bottom bracket shell; a drive train having a rotatable pedal crank mounted about the bottom bracket shell, the pedal crank being rotated by a pedaling actuation, and a drive chain extending between and engaging the pedal crank and a rear sprocket of the rear wheel to transmit the pedaling actuation to the rear wheel; an electric motor mounted to the frame and having a motor output shaft, the motor output shaft defining an output end engaging the drive chain to transmit the drive of the electric motor thereto; and a torque sensor having a base mounted in fixed relation to the frame and/or the electric motor, the torque sensor having a flexible arm extending from the base and a sensing member mounted to an extremity of the flexible arm, the extremity being displaceable relative to the base, the sensing member engaging the drive chain along a segment thereof and being displaceable thereby, the segment of the drive chain extending from the output end of the motor output shaft to the pedal crank of the drive train.

There is also provided, in accordance with another aspect of the present invention, an electric propulsion system for a bicycle mountable to a frame of the bicycle, the electric propulsion system comprising: a housing mountable to the frame; an electric motor disposed within the housing and having a motor output shaft, the motor output shaft defining an output end disposed within the housing and engageable with a drive chain of the bicycle to transmit the drive of the electric motor thereto; and a torque sensor having a base mounted in fixed relation to the frame and/or the electric motor, the torque sensor having a flexible arm extending from the base and a sensing member mounted to an extremity of the flexible arm, the extremity being displaceable relative to the base, the sensing member being engageable with the drive chain along a segment thereof and being displaceable thereby, the segment of the drive chain extending from the output end of the motor output shaft to a pedal crank of the bicycle.

In the electric propulsion system described herein, the torque sensor may be disposed within the housing.

The electric propulsion system described herein may further comprise a magnet mounted to the arm between opposed extremities thereof, and a Hall effect sensor mounted to the housing and spaced from the magnet.

There is further provided, in accordance with another aspect of the present invention, a torque sensor mountable to a bicycle having a frame and an electric motor, the torque sensor comprising: a flexible arm and a sensing member mounted to an extremity of the arm, the sensing member being engageable with a drive chain of the bicycle along a segment thereof and being displaceable by the drive chain, the segment of the drive chain extending from an output of the electric motor to a pedal crank of the bicycle.

In the torque sensor described herein, a first extremity of the flexible arm may include a mounting bracket and the sensing member is disposed at a second extremity of the arm.

In the torque sensor described herein, the sensing member may include a rotatable gear disposed at the second extremity of the arm and engageable with the drive chain.

In the torque sensor described herein, the flexible arm may be curved between the first and second extremities, a curvature length being defined between the first and second extremities along a curvature of the curved flexible arm, a straight line being defined between the first and second extremities and having a straight line length, the curvature length being greater than the straight line length.

In the torque sensor described herein, the flexible arm may have a twisted portion between the first and second extremities thereof, the twisted portion having a first segment linked to the sensing member, a second segment linked to the mounting bracket, and a third segment between the first and second segments, the first and second segments being spaced apart in overlapping arrangement.

In the torque sensor described herein, the flexible arm may have a twisted portion between the first and the second extremities thereof, the twisted portion having a first segment linked to the sensing member, a second segment linked to the mounting bracket, and a third segment between the first and second segments, each of the first, second, and third segments being curved along their length, and the twisted portion being sinuous along an extent thereof.

The torque sensor described herein may further comprise a magnet mounted to the arm between opposed extremities thereof.

In accordance with another aspect of the present, there is also provided a method for converting a non-electric bicycle into an electric bicycle, the method comprising: providing an electric motor having a motor output shaft defining an output end, and providing a torque sensor having a flexible arm and a rotatable sensing member mounted to an extremity of the arm; mounting the electric motor to a frame of the non-electric bicycle; and extending a drive chain at least between a pedal crank of the non-electric bicycle, the output end of the motor output shaft, and the sensing member of the torque arm, the sensing member engaging the drive chain between the output end and the pedal crank.

In the electric bicycle described herein, the flexible arm of the torque sensor may be curved between the base and the extremity, a curvature length being defined between the base and the extremity along a curvature of the curved flexible arm, a straight line being defined between the base and extremity and having a straight line length, the curvature length being greater than the straight line length.

In the electric bicycle described herein, the flexible arm of the torque sensor may have a twisted portion between the base and the extremity thereof, the twisted portion having a first segment linked to the sensing member, a second segment linked to the base, and a third segment between the first and second segments, the first and second segments being spaced apart in overlapping arrangement.

In the electric bicycle described herein, each of the first, second, and third segments may be curved along their respective lengths, and the twisted portion being sinuous along an extent thereof.

In the electric propulsion system described herein, the flexible arm of the torque sensor may be curved between the base and the extremity, a curvature length being defined between the base and the extremity along a curvature of the curved flexible arm, a straight line being defined between the base and extremity and having a straight line length, the curvature length being greater than the straight line length.

In the electric propulsion system described herein, the flexible arm of the torque sensor may have a twisted portion between the base and the extremity thereof, the twisted portion having a first segment linked to the sensing member, a second segment linked to the base, and a third segment between the first and second segments, the first and second segments being spaced apart in overlapping arrangement.

In the electric propulsion system described herein, each of the first, second, and third segments may be curved along their respective lengths, and the twisted portion being sinuous along an extent thereof.

BRIEF DESCRIPTION OF THE DRAWINGS

Reference is now made to the accompanying figures in which:

FIG. 2 is a perspective view of the electric propulsion system and torque sensor of FIG. 1B;

DETAILED DESCRIPTION

Figure 1A:
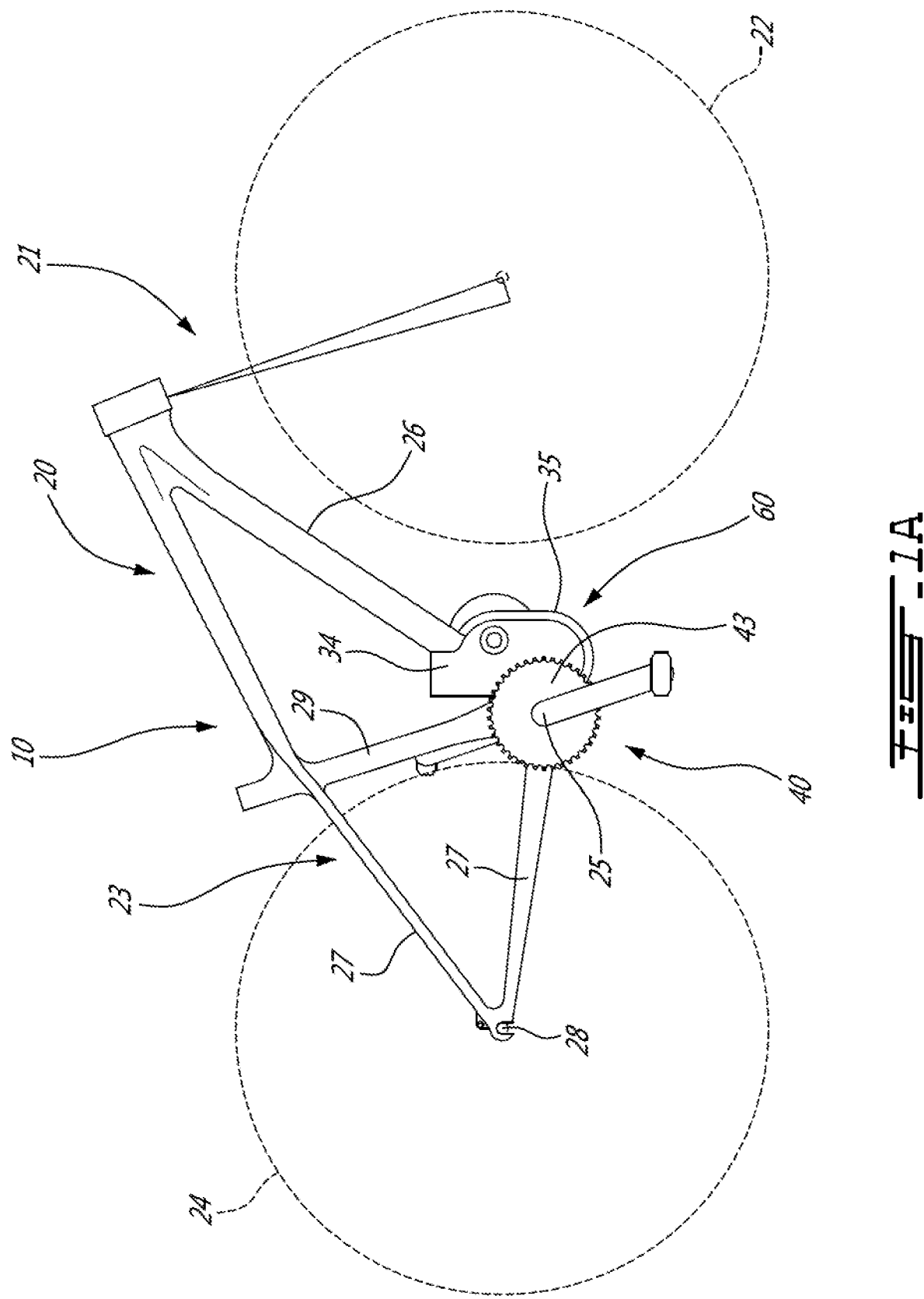
FIG. 1A is a schematic side elevation view of an electric bicycle having an electric propulsion system, according to an embodiment of the present disclosure.
Figure 1B:
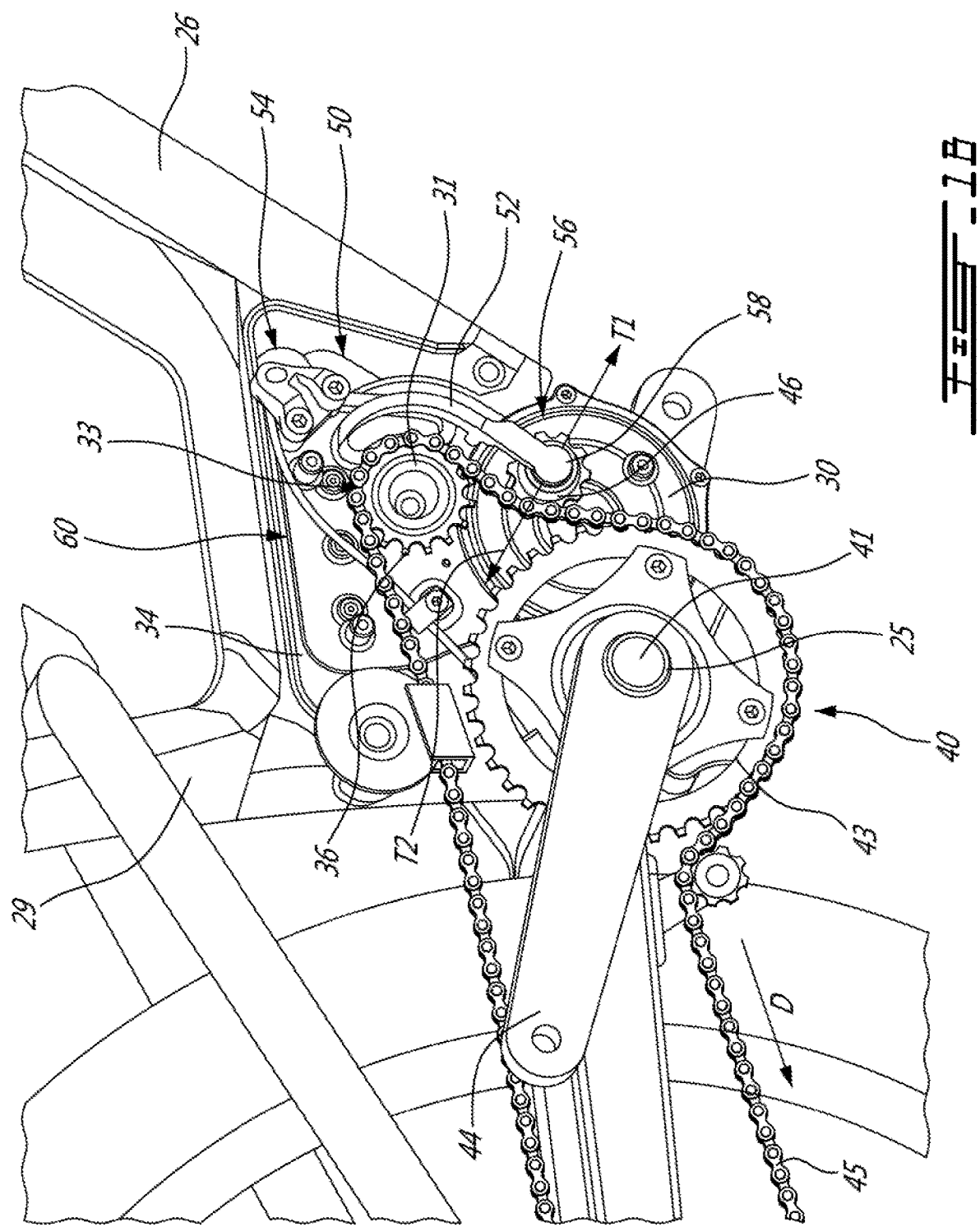
FIG. 1B is an enlarged view of the electric propulsion system of FIG. 1A showing a torque sensor.

FIGS. 1A and 1B illustrate an electric bicycle 10. By "electric", it is understood that the bicycle 10 can be partially or entirely driven by a motive force supplied by an electric motor, or which can be wholly driven only by pedal power when desired. The motive force can therefore also be disengaged so that the bicycle 10 can be driven entirely by the pedalling actuation force generated by the rider. The bicycle 10 can take many different configurations, and have a different frame and configuration of components than that shown in the figures, provided that it remains at least partially electrically-driven by an electric propulsion system as will be described below. The electric bicycle 10 may be either configured to be a road or city bike, or a mountain bike. The bicycle 10 has a frame 20, a drive train 40, and an electric propulsion system 60.

The frame 20 forms the corpus of the bicycle 10 and provides structure thereto so that it can be used by a rider. For example, the frame 20 shown in FIG. 1A may be either a "hardtail" bicycle 10 (i.e. one having no suspension) or a suspended (or "fully suspended") bicycle (i.e. one having a rear suspension). Many other types of frames 20 are also within the scope of the present disclosure, including for example mountain bicycles or street bicycles having a rear suspension. For example, in addition to the multi-body construction of the frame 20 of FIGS. 1A and 1B, the frame 20 can be of a unibody construction if so desired. Irrespective of its shape or configuration, the frame 20 of the present disclosure has a front frame portion 21, a rear frame portion 23, and a bottom bracket shell 25, all of which are now described in greater detail.

The front frame portion 21 forms the front of the frame 20 and includes the front wheel fork which is attached at its most forward end to the front wheel 22 of the bicycle 10, which rotates about a wheel axis. The front frame portion 21 of the main frame includes at least a down tube 26, and can also include a top tube, a seat tube, a head tube, a front-wheel suspension, etc. Indeed, the front frame portion 21 can have many other components, depending on the configuration of the bicycle 10 and its intended use, among other possible factors.

The rear frame portion 23 forms the rear of the frame 20 and is attached at its rearmost end to the rear wheel 24, which also rotates about a rear wheel axis. The rear frame portion 23 has stays 27, such as seat and chain stays, which link the rear wheel 24 to the front frame portion 21. As with the front frame portion 21, the rear frame portion 23 may include other bicycle components including, but not limited to, a rear-wheel suspension, a rear wheel sprocket, a rear wheel hub, a derailleur, etc.

The front and rear frame portions 21, 23 meet generally in the vicinity of the seat tube 29 of the frame 20, and define junctions. One such junction may be formed where the down tube 26 and the chain stays 27 meet, and defines a bottom bracket shell 25. The bottom bracket shell 25 may be located elsewhere on the frame 20 at a bottom end thereof. The bottom bracket shell 25 (or simply "bottom bracket 25") is essentially a hollow tubular portion extending between the left and right sides of the bicycle 10 along a center axis. The bottom bracket 25 receives therein a crank shaft as will be seen.

Still referring to FIGS. 1A and 1B, the drive train 40 is adapted to receive a pedalling actuation, or input of force, from the rider of the bicycle 10. The drive train 40 can be coupled or connected to the electric propulsion system 60, as required, so that the electric propulsion system 60 can complement or replace the force applied by the user. Alternatively, the drive train 40 can be decoupled or disconnected from the electric propulsion system 60 so that the rider can supply all the force required to propel the bicycle 10. The drive train 40 includes a crank shaft 41, a pedal crank 43 (ex: one or more chain rings), and a drive chain 45.

The crank shaft 41 is rotatably mounted within the bottom bracket 25 and extends transversely therethrough between the left and right sides of the bicycle 10. The crank shaft 41 rotates about a central crank shaft axis, which is coincident with the axis of the bottom bracket 25 when the crank shaft 41 is disposed within the bottom bracket 25. The crank shaft 41 is therefore supported by suitable bearings so that it can rotate with respect to the stationary bottom bracket 25 about the crank shaft axis.

The pedal crank 43 (or simply "crank 43") can be any rotatable gear or gears which engage the drive chain 45. In so doing, the crank 43 is able to transfer the rotary force generated by the rider to the rear wheel 24 via the drive chain 45. The crank 43 is disposed on either the left or right side of the bicycle 10, and is mounted to the crank shaft 41. A freewheel clutch may also be provided between the crank 43 and the crank shaft 41. Since the crank 43 is a gear, it can have any suitable size or shape to achieve a desired functionality. For example, the number of teeth or sprockets on the crank 43 can vary depending on the drive chain 45 being used, and the retail cost of the bicycle 10, to name but a few factors. Optionally, the number of teeth can be thirty-eight or forty-two, and cranks 43 having a different number of teeth are also within the scope of the present disclosure.

Crank arms 44 are mounted to the crank 43 in fixed engagement. The crank arms 44 transmit the pedalling force generated by the user to the drive train 40. The free ends of the crank arms 44 typically have pedals against which the feet of the rider apply force. The application of this force to the pedals by the rider creates a pedalling actuation, which is a rotation of the pedals and the crank arms 44 about the crank shaft axis, which in turn rotates the crank shaft 41 and the crank 43. The pedals and crank arms 44 may also be rotated in a direction which does not result in forward propulsion of the bicycle 10, either freely or in order to provide a braking action. The crank arms 44 are mounted to both extremities of the crank shaft 41 on the left and right sides of the bicycle 10.

Still referring to FIGS. 1A and 1B, the drive chain 45 forms the mechanical linkage between the drive train 40, specifically the crank 43, and the rear wheel 24, specifically its rear wheel sprocket 28 mounted to the rear wheel 24 concentrically about its wheel axis. The rear sprocket 28 can include more than one sprocket 28, and can be a cassette or include a freewheel. In the depicted embodiment, the drive chain 45 is located on the same side of the bicycle 10 as the crank 43. Such a positioning of the drive chain 45 and crank 43 advantageously allows for a derailleur to be used with the rear sprocket 28, if so desired. It can thus be appreciated that the drive chain 45 facilitates the transfer of the pedalling actuation from the crank 43 to the rear wheel 24.

The bicycle 10 also has an electric propulsion system 60, thereby making the bicycle 10 an electric bicycle 10 (or electrically-driven bicycle 10). The electric propulsion system 60 (or simply "propulsion system 60") assists the rider of the bicycle 10 by providing an additional and complementary motive force to help the rider propel the bicycle 10 forward. The propulsion system 60 can be the sole motive force propelling the bicycle 10 forward, or a portion thereof. The bicycle 10 may therefore constitute an electrically-assisted bicycle. Alternatively, the propulsion system 60 can be decoupled so that it provides no motive force at all, whereby the bicycle 10 operates like any standard non-motorized bicycle.

As its name suggests, the propulsion system 60 is an electrical system, and thus generates its motive force, or "drive", electrically using any suitable technique. The drive provides a rotational output of power from the propulsion system 60, and specifically from its electric motor. The drive can be applied as a permanent force, or selectively by the rider. The propulsion system 60 can thus be powered by any suitable technique, such as electrochemical cells or an electrical-energy storage device. Optionally, the propulsion system 60 can employ a regenerative breaking to recharge its power source. In the depicted embodiment, the drive produced by the propulsion system 60 is applied to the rear wheel 24 of the bicycle 10. The present propulsion system 60 is relatively compact and lightweight, such that it can be secured to the frame 20. Typically, the propulsion system 60 is mounted to the down tube 26 and/or the seat tube 29 of the front frame portion 21 of the bicycle frame 20, however it can also be mounted elsewhere on the frame 20.

The propulsion system 60 disclosed herein is separate from the bottom bracket shell 25 of the frame 20. More particularly, the propulsion system 60 is mounted to a part of the frame 20 which is at a distance from, and thus separate from, the bottom bracket shell 25. The propulsion system 60 can therefore be mounted to non-electric bicycles so as to provide a motive force that compliments the force provided by the drive train 40, without having to disrupt or modify the existing geometry and ergonomics of the originally non-electric bicycle. The propulsion system 60 can therefore be used to retro-fit or convert a non-electric bicycle into an electric bicycle 10, as will be explained in greater detail below. This contrasts with some conventional electric propulsion systems, which must be mounted through the bottom bracket of the frame, thereby requiring a purpose-built frame configuration and thus often negatively affecting the geometry of the bicycle and the feel of the bicycle to which the user has become accustomed.

Still referring to FIGS. 1A and 1B, the propulsion system 60 includes generally an electric motor 30 for generating the drive which assists the rider and provides motive power to the bicycle 10. The electric motor 30 can thus be any suitable electric machine which converts electrical energy into mechanical motion. The electric motor 30 may therefore have circuitry or electronics cards which govern the power it applies, and its operation. Similarly, the electronic motor 30 has any suitable controllers or processors to process the information provided to the electric motor 30 and to govern its operation.

The electric motor 30 can be contained within a suitable housing 34 or casing which shelters the electric motor 30 and other components of the propulsion system 60 from debris, moisture, and the elements. The housing 34 can have a support bracket 35 which secures the housing 34 in place to the frame 20. The support bracket 35 can secure the housing 34 (and thus the motor 30) to the frame 20 at a distance from the bottom bracket shell 25. The support bracket 35 can be removed in order to permit access to the electric motor 30. FIG. 1B shows an interior of the electric motor 30 after the support bracket 35 and part of the housing 34 have been removed. The electric motor 30, or the housing 34 in which it is contained, are secured to the bicycle frame 20, generally to the down tube 26 and/or the seat tube 29.

Still referring to FIG. 1B, the electrical output of the electric motor 30 generates mechanical motion. The electric motor 30 has a rotor which rotates within a stator inside of the housing 34. A motor output shaft 31 rotates with the rotor, thereby providing useful mechanical motion. The motor output shaft 31 (or simply "motor shaft 31") rotates about a motor shaft axis, which is fixed in position along with the motor shaft 31 in the housing 34 of the electric motor 30 The motor shaft axis forms the centerline of the motor shaft 31 and extends along its length. The motor shaft 31 outputs the rotational mechanical motion generated by the electric motor 30, and thus has an output end 33 located within the housing 34. In the depicted embodiment, the output end 33 is on the same side of the bicycle 10 as the crank 43. This configuration of the output end 33 allows the output end 33 to engage the drive chain 45 and transmit the drive of the electric motor 30 thereto. FIG. 1B shows the output end 33 having an output sprocket 36 engaged with the drive chain 45. Many other configurations of the output end 33 are within the scope of the present disclosure. The speed of the motor output shaft 31, and thus of the output end 33, can vary. One possible range of rotational speeds at the output of the motor is between about zero and about 1,200 RPM, and other rotational speeds and ranges of rotational speeds are within the scope of the present disclosure. It can thus be appreciated that the electrical drive generated by the electric motor 30 is outputted as a mechanical drive via the output end 33 to the drive chain 45, which provides motive power to the bicycle 10.

Still referring to FIG. 1B, the bicycle 10 includes a torque sensor 50. The torque sensor 50 includes a sensor, meter, or transducer for measuring and/or recording the torque on a rotating component, and will now be described in further detail.

In the depicted embodiment, the torque sensor 50 measures the torque applied to the drive chain 45. The torque sensor 50 is therefore disposed in fixed relation to the frame and/or the electric motor, so as to record torque values from the displacement of the drive chain 45 resulting from the drive supplied by the electric motor 30 and/or the crank 43. In the depicted embodiment, the fixed disposition of the torque sensor 50 is obtained by mounting the torque sensor 50 to the housing 34 of the electric motor 30. In the depicted embodiment, the torque sensor 50 is disposed within the housing 34, thereby protecting the torque sensor 50 from debris, moisture, and the elements. In an alternate embodiment, the torque sensor 50 is mounted to a portion of the frame 20 of the bicycle 10.

Figure 3A:
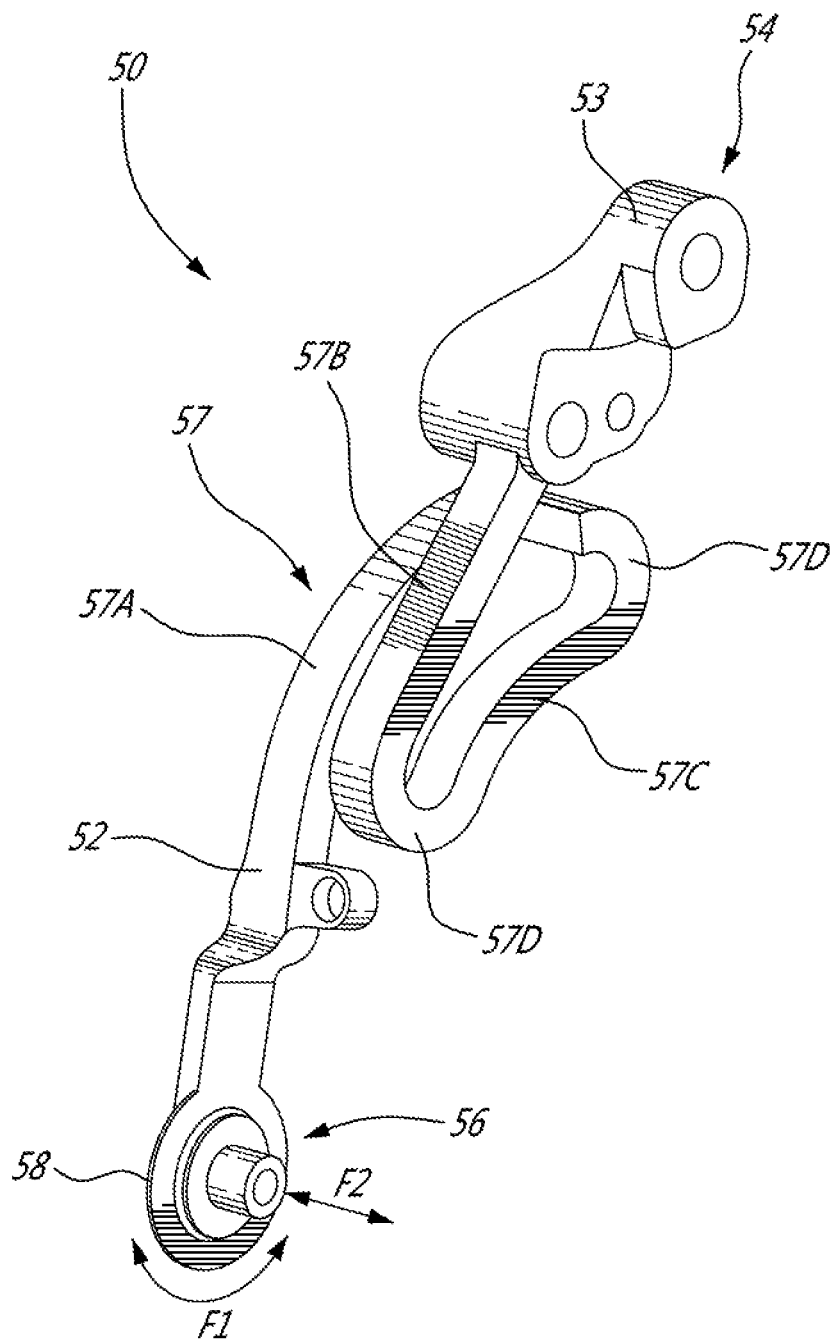
FIG. 3A is a perspective view of the torque sensor of FIG. 1B.
Figure 3C:
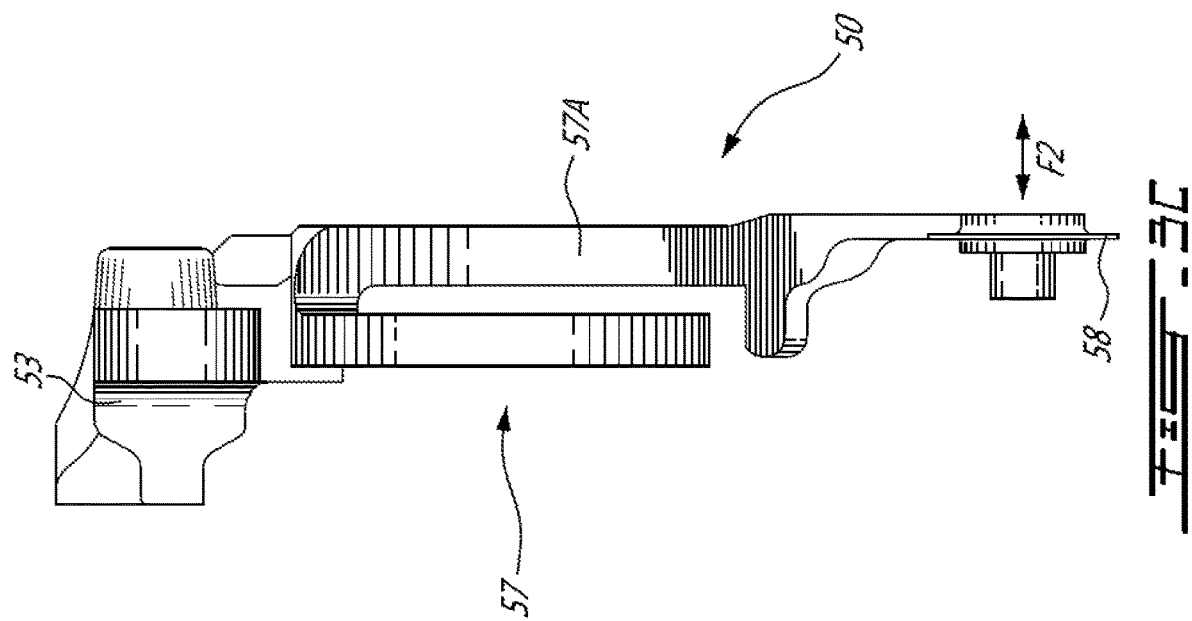
FIG. 3C is a side elevation view of the torque sensor of FIG. 1B.

As seen in FIGS. 2 to 3C, the torque sensor 50 includes a base portion fixedly mounted to the frame and/or the electric motor, and a flexible arm 52 extending from the base portion. In the depicted embodiment, the flexible arm 52 is fixedly mounted to the housing 34 and/or the frame at a first extremity 54 of the arm 52 (i.e. forming the base portion) that does not move relative to the housing 34 and/or the frame to which it is fixed. A second, remote, extremity 56 of the arm 52 is not attached to another structure, and is therefore free to be displaced by the drive chain 45 relative to the fixed base portion of the torque sensor 50, as explained in greater detail below. The displacement of the free second extremity 56 of the arm 52 relative to the immobile first extremity 54 causes flexion of the arm 52. In the depicted embodiment, the flexion of the arm 52 is elastic under normal operating conditions, such that the arm 52 will revert to its original form and position after being flexed. The resiliency of the arm 52 can be obtained from the material from which it is made, the size of its elements, or its configuration, as discussed in greater detail below.

In the depicted embodiment, the flexible arm 52 is curved along its length between the first and second extremities 54, 56. A length of the curved flexible arm 52 is defined between the first and second extremities 54, 56 along a curvature of the arm 52. The length of curvature of the arm 52 is greater than the length of a straight line extending directly between the first and second extremities 54, 56.

The torque sensor 50 also has a sensing member 58 mounted to the free second extremity 56 of the arm 52. The sensing member 58 engages the drive chain 45 and is displaced by movement of the drive chain 45. In the depicted embodiment, the sensing member 58 is biased toward the drive chain 45 to maintain engagement therewith. The flexible arm 52 therefore applies a torque to the drive chain 45 about the base portion. In at least the depicted embodiment, the flexible arm 52 is therefore a torque arm 52. The displacement of the sensing member 58 causes the flexion of the arm 52, thereby permitting the torque on the drive chain 45 to be determined.

Referring to FIG. 2, the sensing member 58 engages a segment 46 of the drive chain 45. The segment 46 of the drive chain 45 extends from the output end 33 of the motor output shaft 31 to the pedal crank 43 of the drive train 40. Stated differently, the sensing member 58 engages the drive chain 45 at a point thereon which, in a direction of travel D of the drive chain 45, is "downstream" (i.e. along the direction of travel D) of the output end 33 of the electric motor, and "upstream" (i.e. against the direction of travel D) of the pedal crank 43. The sensing member 58 therefore engages the drive chain 45 between the two primary sources of torque acting on the drive chain 45, i.e. between the output of torque provided by the electric motor 30 and the output of torque provided by the rider to the crank 43.

When the bicycle 10 is in use, the output of torque from the output end 33 of the motor and from the pedal crank 43 will vary. The tension of the segment 46 of the drive chain 45 will therefore also vary. The change in tension along the segment 46 will cause the sensing member 58 to be displaced. For example, in the embodiment where the sensing member 58 is biased toward the drive chain 45 to maintain engagement therewith, an increase in torque will cause the segment 46 to become more taught and thus "straighten out", and thereby cause the sensing member 58 to be displaced in direction T1. Similarly, a decrease in torque will create slack along the segment 46, and thereby cause the biased sensing member 58 to be displaced in direction T2. The displacement of the sensing member 58 will cause the arm 52 to resiliently flex, thereby allowing a torque measurement to be taken, as described in greater detail below.

It is understood that positioning the sensing member 58 along the segment 46 allows the torque sensor 50 to capture the tension in the drive chain 45 caused by the torque applied by the user at the crank 43, and by the torque provided by the electric motor 30. The ability to measure torque at this location provides for quick readings of torque, and thus faster reaction times for the electric motor 30 output. Stated differently, since the torque sensor 50 allows torque to be measured along the segment 46 of the drive chain 45 that is typically the most taught and right after it has been generated by the electric motor 30, the electric motor 30 is able to provide close to real-time torque adjustments to assist the rider. This compares favourably with conventional devices which measure torque along other parts of the drive chain where there is slack or which are further away from the two primary sources of torque. These conventional devices are too slow to determine the torque requirements of the rider, and may thus cause the assisted power to provide torque assist before or after it is required. Furthermore, by measuring torque directly from the drive chain 45, the torque sensor 50 avoids having to determine torque from the rotation of components such as the crank shaft 41 and the motor output shaft 31.

The information or signal generated by the torque sensor 50 is communicated to the electric motor 30. More particularly, the signal generated by the torque sensor 50 may be processed to provide a suitable motor input signal that is communicated to the controller of the electric motor 30. The controller then applies the appropriate logic to the received motor input signal to govern the output of the electric motor 30 so as to increase, decrease, or leave unchanged its torque output. The signal generated and communicated by the torque sensor 50 can be an analog signal or a digital signal.

Referring still to FIG. 2, in the depicted embodiment, the sensing member 58 includes a rotatable element. More particularly, the sensing member 58 includes a rotatable jockey wheel or gear 51 at the second extremity 56 of the arm 52. The teeth of the gear 51 engage the links of the drive chain 45 such that displacement of the drive chain 45 along its direction of travel D causes the gear 51 to rotate about its axis. In alternate embodiments, the sensing member 58 includes a non-rotating element, such as a guide rail or a slot in the second extremity 56 of the arm 52, against which the segment 46 of the drive chain 45 is engaged. The arm 52 also includes a mounting bracket 53 at the first extremity 54 thereof. The mounting bracket 53 mounts the arm 52 to a structure of the bicycle 10. In the depicted embodiment, the mounting bracket 53 fixedly mounts the arm 52 to the housing 34 of the electric motor 30.

In the depicted embodiment, the torque sensor 50 has a sensor assembly 55 for measuring the torque on the drive chain 45. The sensor assembly 55 includes a magnet 55A mounted to the arm 52 between the first and second extremities 54, 56 thereof. In the depicted embodiment, the magnet 55A is mounted within a grooved magnet housing 55B formed in the arm 52. The sensor assembly 55 also includes a Hall effect sensor 55C mounted to the housing 34 of the electric motor 30 and spaced from the magnet 55A. Similarly to the magnet 55A, the Hall effect sensor 55C is housed within a sensor housing 55D. The sensor housing 55D in the depicted embodiment is part of the housing 34 of the electric motor 30. The sensor housing 55D is therefore stationary with respect to the magnet 55A, and the magnet 55A displaces with the arm 52 when the arm 52 undergoes flexion. The Hall effect sensor 55C outputs a voltage in response to the proximity of the magnet 55A thereto. When the engagement of the sensing member 58 with the drive chain 45 causes the arm 52 to displace under flexion, as explained above, the magnet 55A is displaced with the flexible arm 52 towards or away from the Hall effect sensor 55C. This varies the voltage output of Hall effect sensor 55C, thereby enabling the torque on the drive chain 45 to be determined as a function of the voltage output of the Hall effect sensor 55C.

Other techniques for determining the flexion or strain on the arm 52 are also within the scope of the present disclosure. For example, in one alternative embodiment, the arm 52 has a strain gauge mounted thereon. When force is applied to the arm 52 by the drive chain 45, the arm underdoes strain. The strain gauge is a type of sensor whose resistance varies with strain experienced by the arm 52. This change in electrical resistance is measurable and can be processed to determine the torque on the drive chain 45. In another alternative embodiment, a metal component is mounted to the arm 52 to be displaced therewith, and an induction sensor is part of the housing 34 or frame 20. The induction sensor is therefore stationary with respect to the metal component. The induction sensor measures the displacement of the metal component. The signal from the induction sensor is processed to determine the torque acting on the drive chain 45.

From the above description of the techniques for determining the flexion or strain on the arm 52, it will be appreciated that many "contact-less" techniques are within the scope of the present disclosure. Each contact-less technique allows the arm 52 to displace freely, and for its displacement to be measured without having to contact the arm 52.

Figure 3B:
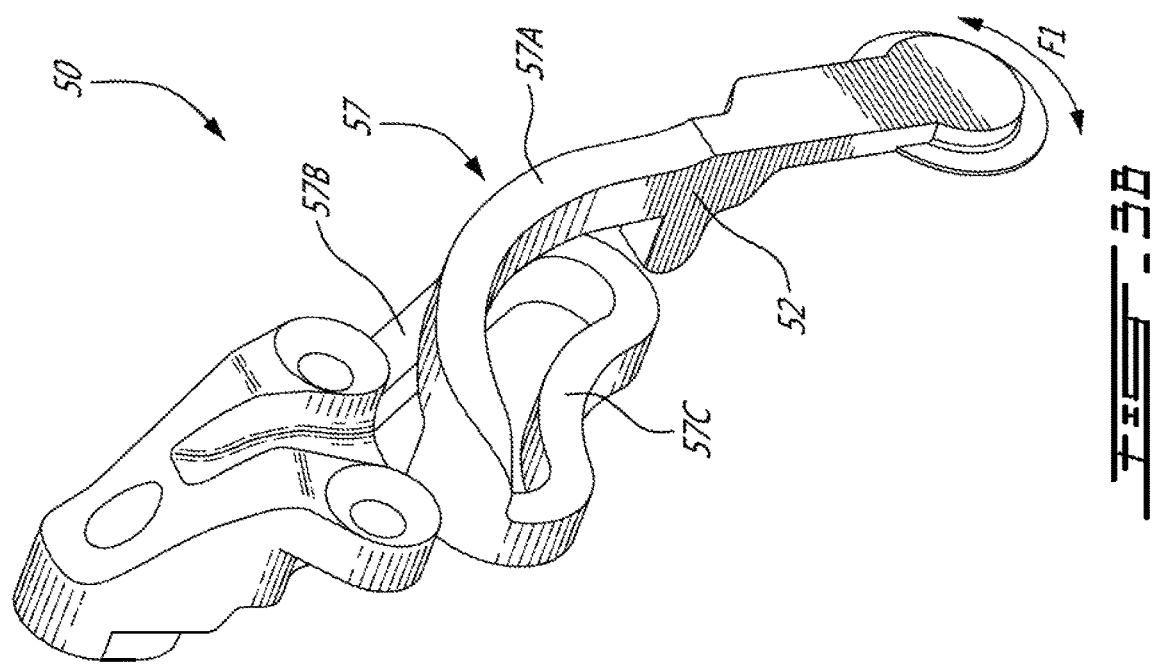
FIG. 3B is another perspective view of the torque sensor of FIG. 1B.

FIGS. 3A to 3C are views of the torque sensor 50 in isolation. In the depicted embodiment, the flexible arm 52 has a twisted portion 57. The twisted portion 57 is a portion of the arm 52 between its first and second extremities 54, 56 that is bent, curved, or otherwise distorted. The twisted portion 57 increases the overall length of the flexible arm 52 while allowing it to occupy a relatively overall space envelope (i.e. a relative small total volume). The twisted portion 57 therefore facilitates placing the torque sensor 50 within the relatively compact housing 34 of the electric motor 30.

In the depicted embodiment, the twisted portion 57 has a first segment 57A, a second segment 57B, and a third segment 57B. The first segment 57A is structurally linked to the sensing member 58 and extends to the second extremity 56. The second segment 57B is structurally linked to the mounting bracket 53 and extends to the first extremity 54. The third segment 57C extends between and links the first and second segments 57A, 57B. Distal ends 57D of the third segment 57C are curved and form curved linkages with the first and second segments 57A, 57B. In the depicted embodiment, the first and third segments 57A, 570 are also curved along their length. The first and second sections 57A, 57B are spaced apart from each other in an overlapping arrangement. This overlapping arrangement is better appreciated in FIG. 2, which shows the first segment 57A lying over and in front of the second segment 57B. It can thus be appreciated that this "coiled" configuration of the arm 52 helps the arm 52 undergo resilient flexion. The overlapping segments 57A, 57B of the twisted portion 57 help to spread flexion of the arm 52 over longer distances, which may ease the overall strain experienced by the arm 52 when in flexion. This reduced strain may also prevent plastic deformation of the arm 52.

This configuration of the arm 52 allows it to resiliently flex in at least two directions in response to force applied to the sensing member 58 via the drive chain 45. The first direction F1 of resilient deflection is shown in FIGS. 3A and 3B, and is similar to directions T1 and T2 described above. The second direction F2 of resilient deflection is shown in FIGS. 3A and 3C, and is transverse to the first direction F1. Resilient deflection of the arm 52 along the second direction F2 allows the arm 52 to accommodate and adapt to unpredictable movements of the drive chain 45.

Figure 4:
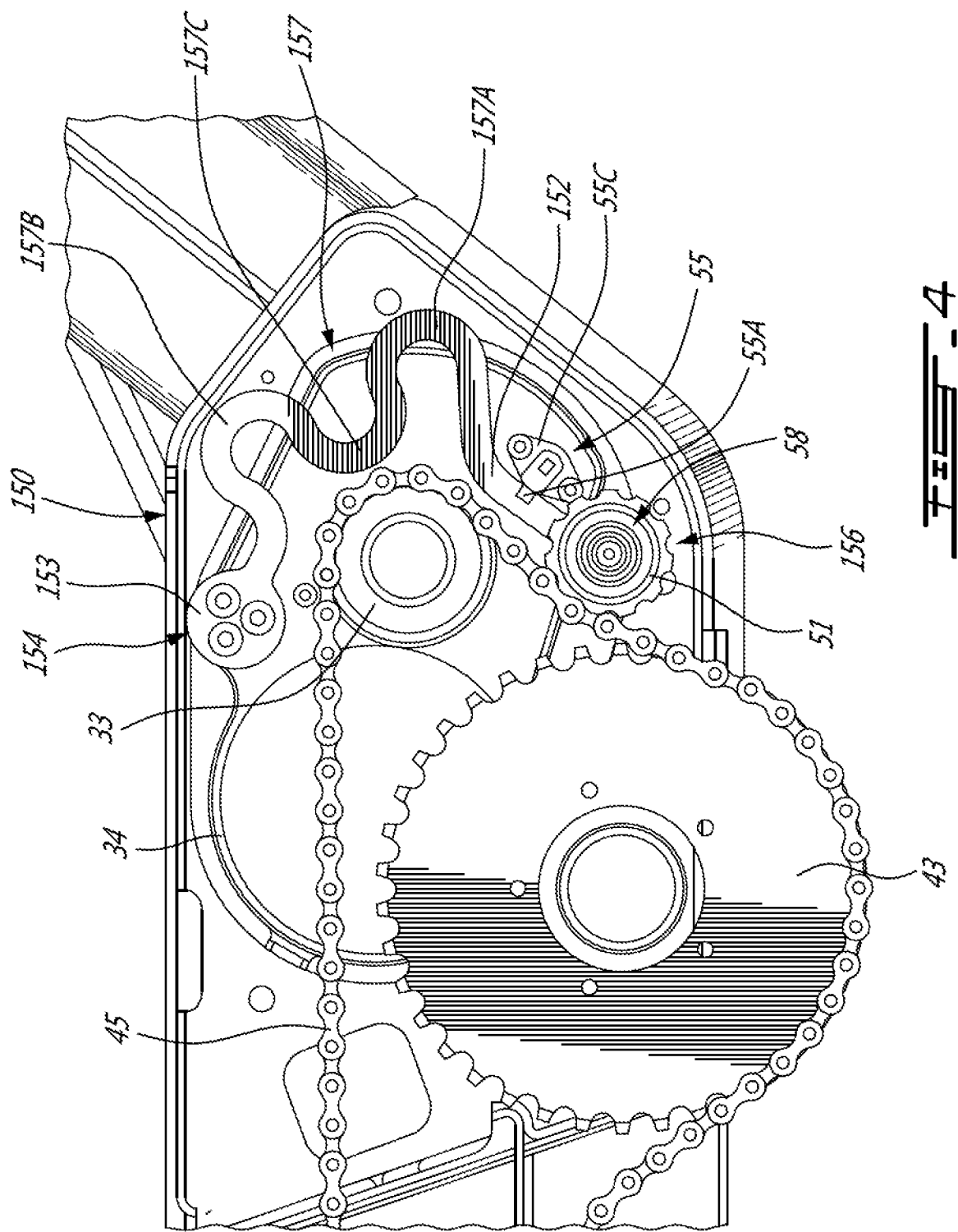
FIG. 4 is a perspective view of a torque sensor according to another embodiment of the present disclosure.

FIG. 4 shows another embodiment of the torque arm 150, with a different configuration of the twisted portion 157. The twisted portion 157 is located between the first and second extremities 154, 156 of the torque arm 150. In the depicted embodiment, the twisted portion 157 has a first segment 157A, a second segment 157B, and a third segment 157B. The first segment 157A is structurally linked to the sensing member 58 (which includes a gear 51) and extends to the second extremity 156. The second segment 157B is structurally linked to the mounting bracket 153 and extends to the first extremity 154. The third segment 157C extends between and links the first and second segments 157A, 157B. In the depicted embodiment, the first, second, and third segments 157A, 157B, 157C are curved along their length. The curved segments 157A, 157B, 157C give the twisted portion 157 a sinuous form along its extent. This compact winding configuration of the twisted portion 157 increases the overall length of the flexible arm 152 while allowing it to occupy a relatively overall space envelope (i.e. a relative small total volume). It can thus be appreciated that this serpentine configuration of the arm 152 helps the arm 152 undergo resilient flexion. The sinuous segments 157A, 157B, 157B of the twisted portion 157 help to spread flexion of the arm 152 over longer distances, which may ease the overall strain experienced by the arm 152 when in flexion. This reduced strain may also prevent plastic deformation of the arm 152.

FIG. 4 also shows the gear 51 of the sensing member 58 engaged with the drive chain 45 between the output end 33 of the electric motor 30 and the crank 43. FIG. 4 also shows the sensor assembly 55 with its magnet 55A mounted to the arm 152 between the first and second extremities 154, 156 thereof. The Hall effect sensor 55C of the sensor assembly 55 is mounted to the housing 34 of the electric motor 30 and spaced from the magnet 55A.

Other embodiments of the twisted portion 57, 157 are also within the scope of the present disclosure. In one such embodiment, the twisted portion has more than three segments. In this embodiment, multiple twisted and overlapping segments extend between and link the first and second segments.

The above description is meant to be exemplary only, and one skilled in the art will recognize that changes may be made to the embodiments described without departing from the scope of the invention disclosed. For example, although shown and described herein as being used with a bicycle 10, the torque sensor 50 in alternate embodiments is used with a vehicle having fewer or more wheels, such as a unicycle, a tricycle, and a quadricycle. Other modifications which fall within the scope of the present invention will be apparent to those skilled in the art, in light of a review of this disclosure, and such modifications are intended to fall within the appended claims.

The invention claimed is:

1. An electric bicycle, comprising:
a frame to which a front wheel and a rear wheel are rotatably mounted and having a bottom bracket shell;
a drive train having a rotatable pedal crank mounted about the bottom bracket shell, the pedal crank being rotated by a pedaling actuation, and a drive chain extending between and engaging the pedal crank and a rear sprocket of the rear wheel to transmit the pedaling actuation to the rear wheel;
an electric motor mounted to the frame and having a motor output shaft, the motor output shaft defining an output end engaging the drive chain to transmit the drive of the electric motor thereto; and
a torque sensor having a base mounted in fixed relation to the frame and/or the electric motor, the torque sensor having a flexible arm extending from the base and a sensing member mounted to an extremity of the flexible arm, the extremity being displaceable relative to the base, the sensing member engaging the drive chain along a segment thereof and being displaceable thereby, the segment of the drive chain extending from the output end of the motor output shaft to the pedal crank of the drive train.

2. The electric bicycle according to claim 1, wherein the flexible arm of the torque sensor is curved between the base and the extremity, a curvature length being defined between the base and the extremity along a curvature of the curved flexible arm, a straight line being defined between the base and extremity and having a straight line length, the curvature length being greater than the straight line length.

3. The electric bicycle according to claim 1, wherein the flexible arm of the torque sensor has a twisted portion between the base and the extremity thereof, the twisted portion having a first segment linked to the sensing member, a second segment linked to the base, and a third segment between the first and second segments, the first and second segments being spaced apart in overlapping arrangement.

4. The electric bicycle according to claim 3, wherein each of the first, second, and third segments are curved along their respective lengths, and the twisted portion being sinuous along an extent thereof.

5. The electric bicycle according to claim 1, wherein the electric motor is disposed within a housing mounted to the frame, the output end of the motor output shaft being disposed within the housing.

6. The electric bicycle according to claim 5, wherein the torque sensor is disposed within the housing.

7. The electric bicycle according to claim 1, further comprising a magnet mounted to the flexible arm between opposed extremities thereof, and a Hall effect sensor mounted to the housing and spaced from the magnet.

8. An electric propulsion system for a bicycle mountable to a frame of the bicycle, the electric propulsion system comprising:
a housing mountable to the frame;
an electric motor disposed within the housing and having a motor output shaft, the motor output shaft defining an output end disposed within the housing and engageable with a drive chain of the bicycle to transmit the drive of the electric motor thereto; and
a torque sensor having a base mounted in fixed relation to the frame and/or the electric motor, the torque sensor having a flexible arm extending from the base and a sensing member mounted to an extremity of the flexible arm, the extremity being displaceable relative to the base, the sensing member being engageable with the drive chain along a segment thereof and being displaceable thereby, the segment of the drive chain extending from the output end of the motor output shaft to a pedal crank of the bicycle.

9. The electric propulsion system according to claim 8, wherein the flexible arm of the torque sensor is curved between the base and the extremity, a curvature length being defined between the base and the extremity along a curvature of the curved flexible arm, a straight line being defined between the base and extremity and having a straight line length, the curvature length being greater than the straight line length.

10. The electric propulsion system according to claim 8, wherein the flexible arm of the torque sensor has a twisted portion between the base and the extremity thereof, the twisted portion having a first segment linked to the sensing member, a second segment linked to the base, and a third segment between the first and second segments, the first and second segments being spaced apart in overlapping arrangement.

11. The electric propulsion system according to claim 10, wherein each of the first, second, and third segments are curved along their respective lengths, and the twisted portion being sinuous along an extent thereof.

12. The electric propulsion system according to claim 8, wherein the torque sensor is disposed within the housing.

13. The electric propulsion system according to claim 8, further comprising a magnet mounted to the flexible arm between opposed extremities thereof, and a Hall effect sensor mounted to the housing and spaced from the magnet.

14. A torque sensor mountable to a bicycle having a frame and an electric motor, the torque sensor comprising: a flexible arm and a sensing member mounted to an extremity of the arm, the sensing member being engageable with a drive chain of the bicycle along a segment thereof and being displaceable by the drive chain, the segment of the drive chain extending from an output of the electric motor to a pedal crank of the bicycle.

15. The torque sensor according to claim 14, wherein a first extremity of the flexible arm includes a mounting bracket and the sensing member is disposed at a second extremity of the arm.

16. The torque sensor according to claim 15, wherein the sensing member includes a rotatable gear disposed at the second extremity of the arm and engageable with the drive chain.

17. The torque sensor according to claim 15, wherein the flexible arm is curved between the first and second extremities, a curvature length being defined between the first and second extremities along a curvature of the curved flexible arm, a straight line being defined between the first and second extremities and having a straight line length, the curvature length being greater than the straight line length.

18. The torque sensor according to claim 14, wherein the flexible arm has a twisted portion between the first and second extremities thereof, the twisted portion having a first segment linked to the sensing member, a second segment linked to the mounting bracket, and a third segment between the first and second segments, the first and second segments being spaced apart in overlapping arrangement.

19. The torque sensor according to claim 14, wherein the flexible arm has a twisted portion between the first and second extremities thereof, the twisted portion having a first segment linked to the sensing member, a second segment linked to the mounting bracket, and a third segment between the first and second segments, each of the first, second, and third segments being curved along their length, and the twisted portion being sinuous along an extent thereof.

20. The torque sensor according to claim 14, further comprising a magnet mounted to the arm between opposed extremities thereof.

21. A method for converting a non-electric bicycle into an electric bicycle, the method comprising:
    providing an electric motor having a motor output shaft defining an output end, and providing a torque sensor having a flexible arm and a rotatable sensing member mounted to an extremity of the arm;
    mounting the electric motor to a frame of the non-electric bicycle; and
    extending a drive chain at least between a pedal crank of the non-electric bicycle, the output end of the motor output shaft, and the sensing member of the torque sensor, the sensing member engaging the drive chain between the output end and the pedal crank.

* * * * *